US006910525B2

(12) United States Patent
Gokan et al.

(10) Patent No.: US 6,910,525 B2
(45) Date of Patent: Jun. 28, 2005

(54) HEAT EXCHANGER (75) Inventors: Yoshitsugu Gokan, Saitama (JP); Kazuhiko Tomoda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/188,072

(22) Filed: Jul. 3, 2002

(65) Prior Publication Data
US 2003/0019483 A1 Jan. 30, 2003

(30) Foreign Application Priority Data
Jul. 13, 2001 (JP) ........................................ 2001-213493

(51) Int. Cl.⁷ ................................................. F28F 9/22
(52) U.S. Cl. .......................... 165/51; 165/159; 123/563
(58) Field of Search .......................... 165/51, 159, 160; 123/563; 60/599

(56) References Cited

U.S. PATENT DOCUMENTS

| | | | | |
|---|---|---|---|---|
| 6,293,264 B1 | * | 9/2001 | Middlebrook | 123/563 |
| 6,544,086 B2 | * | 4/2003 | Tscherne et al. | |
| 6,601,528 B2 | * | 8/2003 | Bilek et al. | |
| 2001/0044244 A1 | * | 11/2001 | Tscherne et al. | |
| 2003/0013361 A1 | * | 1/2003 | Gokan | |

* cited by examiner

*Primary Examiner*—Ljiljana Ciric
(74) *Attorney, Agent, or Firm*—Birch, Stewart, Kolasch & Birch, LLP (57) ABSTRACT

A heat exchanger is interposed between a supercharger of an internal combustion engine and an intake port of the internal combustion engine. The plate partially closes a space between an outer periphery of heat exchanger fins housed in a case and a case inner wall surface to form an air channel in a portion other than a closing part thereof. The plate may be constructed as an aluminum plate. The outlet is provided with a net member for foreign matter passage prevention.

16 Claims, 8 Drawing Sheets

HEAT EXCHANGER

CROSS-REFERENCE TO RELATED APPLICATIONS

The present application claims priority under 35 USC 119 to Japanese Patent Application No. 2001-213493 filed on Jul. 13, 2001 the entire contents thereof is hereby incorporated by reference.

BACKGROUND OF THE INVENTION

1. Field of the Invention

The present invention relates to a heat exchanger. More specifically, the present invention relates to a heat exchanger interposed between a supercharger of an internal combustion engine and an intake port of the internal combustion engine for use in cooling intake air.

2. Description of Background Art

A heat exchanger is known that is provided with a case having an intake inlet in communication with a supercharger and an outlet in communication with an intake port of an internal combustion engine with the heat exchanger fins housed in the case. The heat exchanger is constructed so that the heat exchanger fins are bodies that are different from the case, and the heat exchanger fins are housed in the case.

Air flowing from the supercharger through the intake inlet into the case is basically contacted with the heat exchanger fins to be cooled and is then supplied from the outlet to the intake port of the internal combustion engine.

In the above-described heat exchanger, it is difficult to completely close a space between an outer periphery of the heat exchanger fin housed in the case and the case inner wall surface.

For this reason, in the prior art heat exchanger, other than an original air channel, that is, a channel in which air enters the intake inlet to be contacted with the heat exchanger fins and then exists from the outlet, there is formed a channel passing through a space formed throughout the circumference between the outer periphery of the heat exchanger fin and the case inner wall surface.

In the prior art heat exchanger, part of the air entering the intake inlet is hardly contacted with the heat exchanger fins and passes through the space to exit from the outlet. The heat exchanger effectiveness is not enough.

SUMMARY AND OBJECTS OF THE INVENTION

An object of the present invention is to provide a heat exchanger which can solve the above-described problems and enhance a heat exchange effectiveness.

To achieve the foregoing object, a heat exchanger according to the present invention is interposed between a supercharger of an internal combustion engine and an intake port of the internal combustion engine and provided with a case having an intake inlet in communication with the supercharger and an outlet in communication with the intake port of the internal combustion engine and heat exchanger fins housed in the case. A plate is provided as a body that is different from the case which partially closes a space between an outer periphery of the heat exchanger fin and a case inner wall surface to form an air channel in a portion other than a closing part thereof.

In the heat exchanger according to present invention, the plate is made of aluminum.

In the heat exchanger according to present invention, the intake inlet and the outlet are formed on the same side of the case, and between the intake inlet and the outlet, the plate closes the space between the inner wall surface of the case on the side forming the intake inlet and the outlet and the outer periphery of the heat exchanger fin.

In the heat exchanger according to present invention, a plurality of the heat exchanger fins are stacked with a predetermined pitch, and the plate partially closes the space between the outer periphery of at least one of the heat exchanger fins and the case inner wall surface.

In the heat exchanger according to present invention, the outlet is provided with a net member for foreign matter passage prevention.

In the heat exchanger according to present invention, the net member is integrally provided in the plate.

The heat exchanger according to present invention may be used in a small boat.

A heat exchanger according to present invention is interposed between a supercharger of an internal combustion engine and an intake port of the internal combustion engine and provided with a case having an intake inlet in communication with the supercharger and an outlet in communication with the intake port of the internal combustion engine and heat exchanger fins housed in the case. A plate is provided as a body different from the case which partially closes a space between an outer periphery of the heat exchanger fin and a case inner wall surface to form an air channel in a portion other than a closing part thereof. According to the heat exchanger, air entering the intake inlet all contacts with the heat exchanger fins prior to exiting from the outlet.

The heat exchanger can provide an effect for enhancing the heat exchanger effectiveness and the intake cooling efficiency.

In addition, when intake spit-back (the so-called back fire) from the combustion chamber of the internal combustion engine occurs, in the prior art heat exchanger, part of the back fire entering the outlet can be hardly contacted with the heat exchanger fins and passes through the space to exit from the intake inlet to the supercharger side. A dedicated spark arrester is thus necessary. In the heat exchanger according to present invention, the back fire is prevented from directly moving from the outlet of the heat exchanger to the intake inlet and is contacted with the heat exchanger fins for cooling to be quenched. The dedicated spark arrester need not be provided.

Further, the plate is a body that is different from the case. The space between the outer periphery of the heat exchanger fin and the case inner wall surface can be closed by a simple construction.

In the heat exchanger according to present invention, the plate is made of aluminum. Intake air and back fire contacted with the plate can be heat drawn efficiently.

In the heat exchanger according to present invention, the intake inlet and the outlet are formed on the same side of the case, and between the intake inlet and the outlet, the plate closes the space between the inner wall surface of the case on the side forming the intake inlet and the outlet and the outer periphery of the heat exchanger fin. The plate and the heat exchanger itself can be smaller.

In the heat exchanger according to present invention, a plurality of the heat exchanger fins are stacked with a predetermined pitch, and the plate partially closes the space between the outer periphery of at least one of the heat exchanger fins and the case inner wall surface. The pitch of the heat exchanger fins and the attaching position of the plate effective for the cooling efficiency and the back fire quenching can be selected freely.

In the heat exchanger according to present invention, the outlet is provided with a net member for foreign matter passage prevention. In the event that the supercharger and the heat exchanger fins deteriorate and part of the supercharger and the heat exchanger fins peels (or falls), the foreign matters (the peeled or the fallen objects) are stopped by the net member to be prevented from reaching the intake port of the internal combustion engine.

In particular, according to present invention, when the heat exchanger is used for a small boat, the supercharger and the heat exchanger fins easily deteriorate. The construction according to present invention is particularly effective for using the heat exchanger in a small boat.

In the heat exchanger according to present invention, the net member is integrally provided in the plate. Attachment of the net member and assembling of the plate are done at the same time. The net member need not be attached separately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
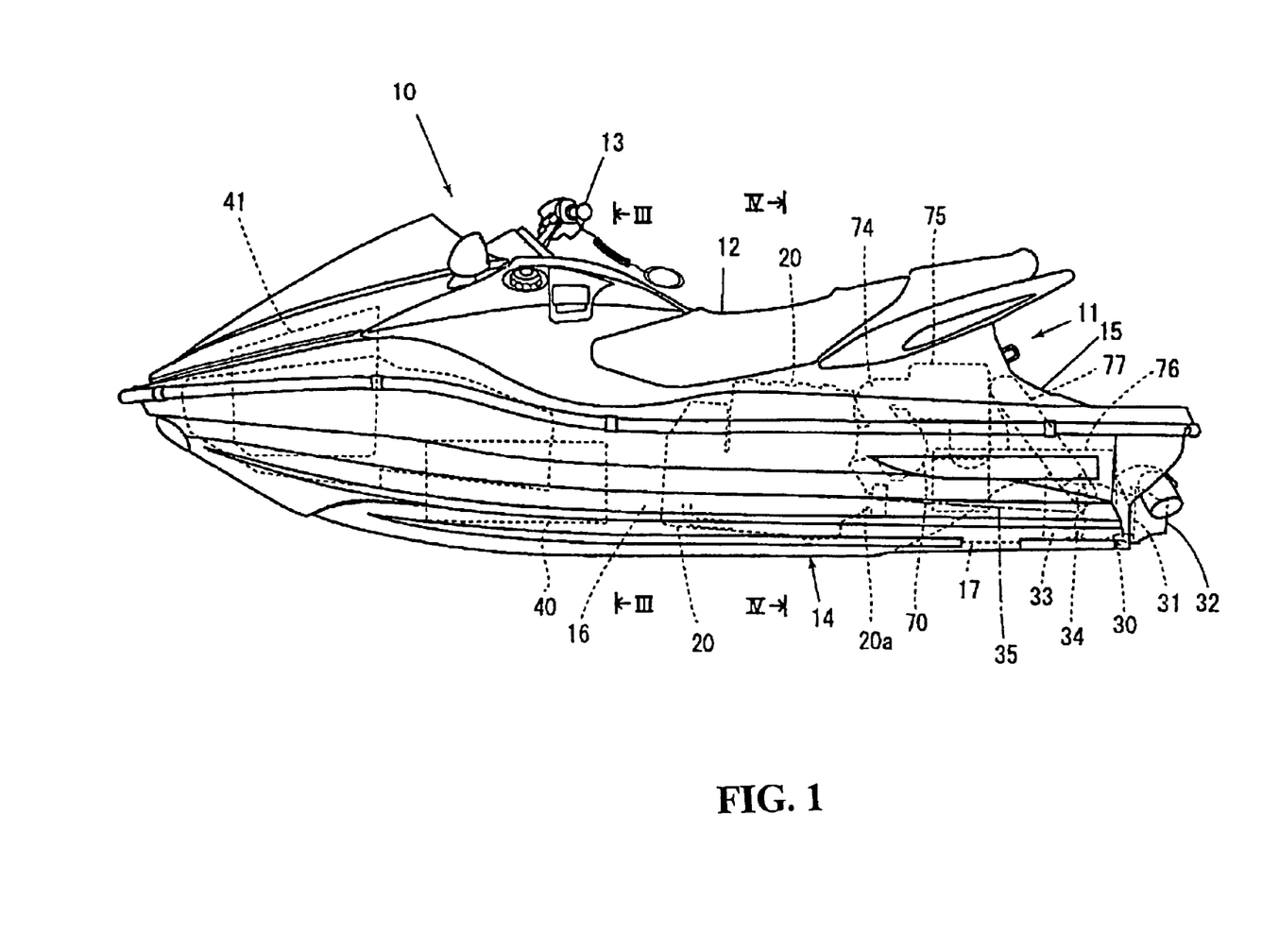
FIG. 1 is a schematic side view showing an example of a small boat using a working example of a heat exchanger according to the present invention.

As shown in FIG. 1, a small boat 10 of this working example is a saddle-ride type small boat. A rider sits on a seat 12 of a body 11 and can grab and steer a steering handlebar 13 with a throttle lever.

The body 11 is a floating construction by joining a lower hull panel 14 to an upper hull panel 15 to form a space 16 inside. In the space 16, an engine (internal combustion engine) 20 is mounted on the lower hull panel 14. A jet pump 30 as a propulsion means is driven by the engine 20 and is provided in the rear portion of the lower hull panel 14.

The jet pump 30 has a channel 33 from a water intake 17 that is opened in the boat bottom to a jet port 31 and a nozzle 32 opened at the rear end of the body and an impeller 34 arranged in the channel 33. A shaft 35 of the impeller 34 is coupled to an output shaft 20a of the engine 20. When the engine 20 rotatably drives the impeller 34, water admitted from the water intake 17 is jetted from the jet port 31 through the nozzle 32, so that the body 11 is propulsive. The driving rotation speed of the engine 20, that is, the propulsion of the jet pump 30 is operated by the rotating operation of a throttle lever 13a (see FIG. 2) of the steering handlebar 13. The nozzle 32 is linked to the steering handlebar 13 by an operation wire, not shown, and is rotated by operation of the handlebar 13, thereby changing the direction of the boat.

A fuel tank 40 is provided adjacent to a housing chamber 41.

Figure 4:
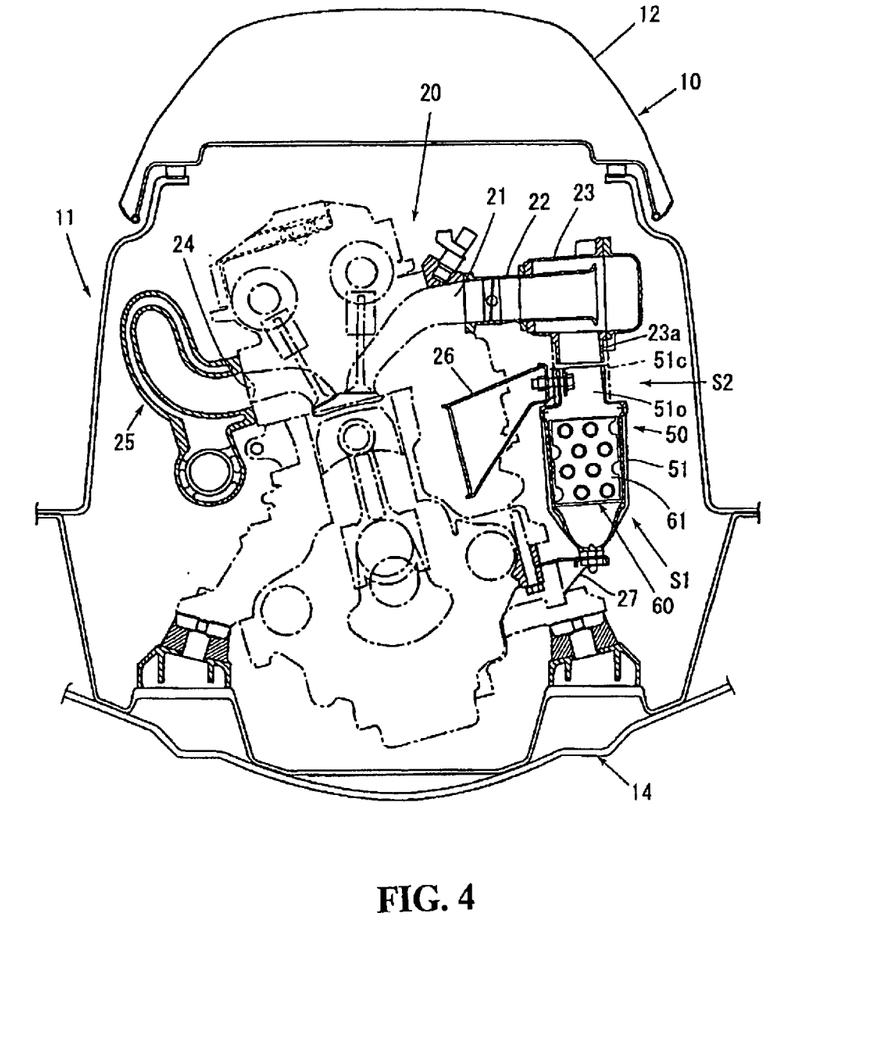
FIG. 4 is a diagram mainly showing an engine 20 and an enlarged cross-sectional view (a cross-sectional view, partly omitted) of part IV—IV of FIG. 1.
Figure 5:
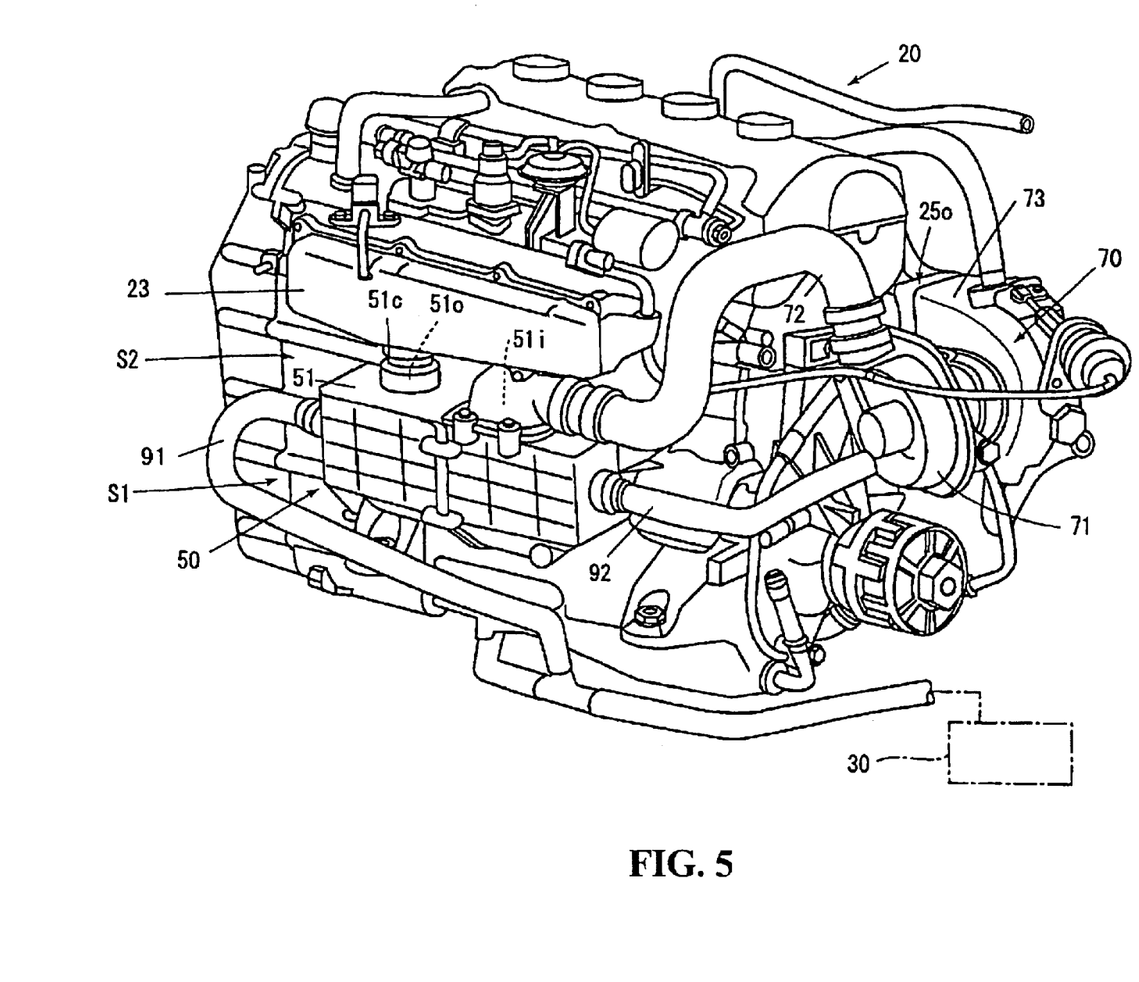
FIG. 5 is a schematic perspective view of the engine 20 seen from the slantingly rear.

FIG. 4 is a diagram mainly showing the engine 20 and is an enlarged cross-sectional view (a cross-sectional view, partly omitted) of part IV—IV of FIG. 1. FIG. 5 is a schematic perspective view of the engine 20 seen from the slantingly rear.

The engine 20 is a DOHC type and a series four-cylinder four-cycle engine. As shown in FIG. 1, its crankshaft (see the output shaft 20a) is arranged along the front and rear directions of the body 11.

As shown in FIG. 4, an intake port 21 is arranged on the left side (the right side in FIG. 4) of the engine 20 seen from the moving direction of the body 11 and an exhaust port 24 is arranged on the right side (the left side in FIG. 4).

The intake port 21 is coupled to an intake duct 22 and a surge tank (intake chamber) 23. A heat exchanger (intercooler) 50 is connected immediately below the surge tank 23. Attaching brackets 26, 27 are provided for attaching the heat exchanger 50 to the engine 20.

As shown in FIG. 5, the heat exchanger 50, which will be described later in detail, is provided with a case 51 having an intake inlet 51i connected and in communication with a compressor part 71 of a supercharger (turbocharger) 70 arranged immediately rearwardly of the engine 20 by a piping 72 and an outlet 51o in communication with the inlet port 21 of the engine 20 via the surge tank 23 and the intake duct 22 and heat exchanger fins 61 (see FIG. 4) housed in the case 51.

In FIG. 5, cooling water hoses 91, 92 are connected to the inter-cooler 50.

As shown in FIG. 4, the exhaust port 24 of the engine 20 is provided with an exhaust manifold 25. An exhaust outlet 25o (see FIG. 5) in the exhaust manifold 25 is connected to a turbine part 73 (see FIG. 5) of the turbocharger 70.

Figure 2:
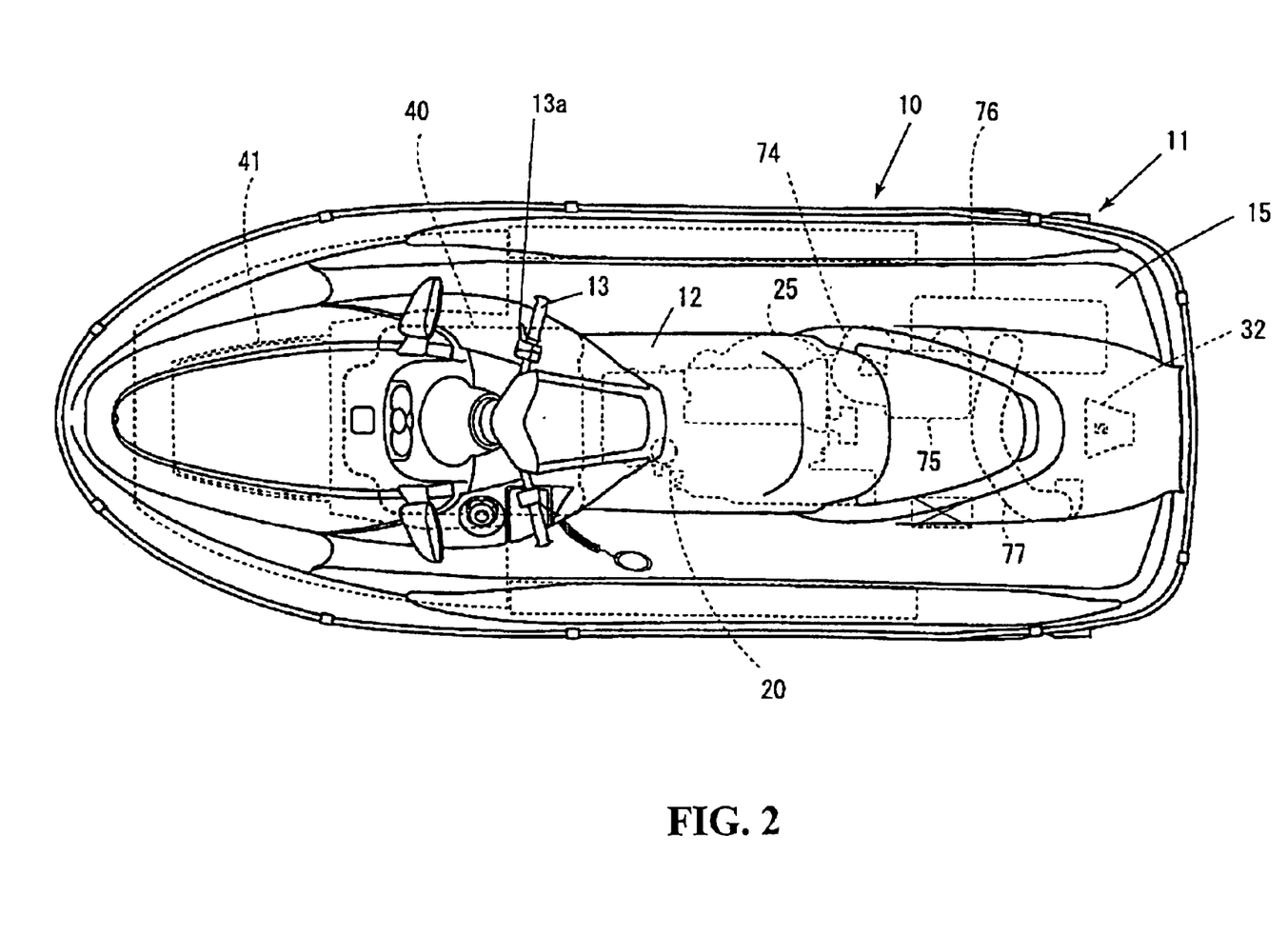
FIG. 2 is a plan view thereof.
Figure 3:
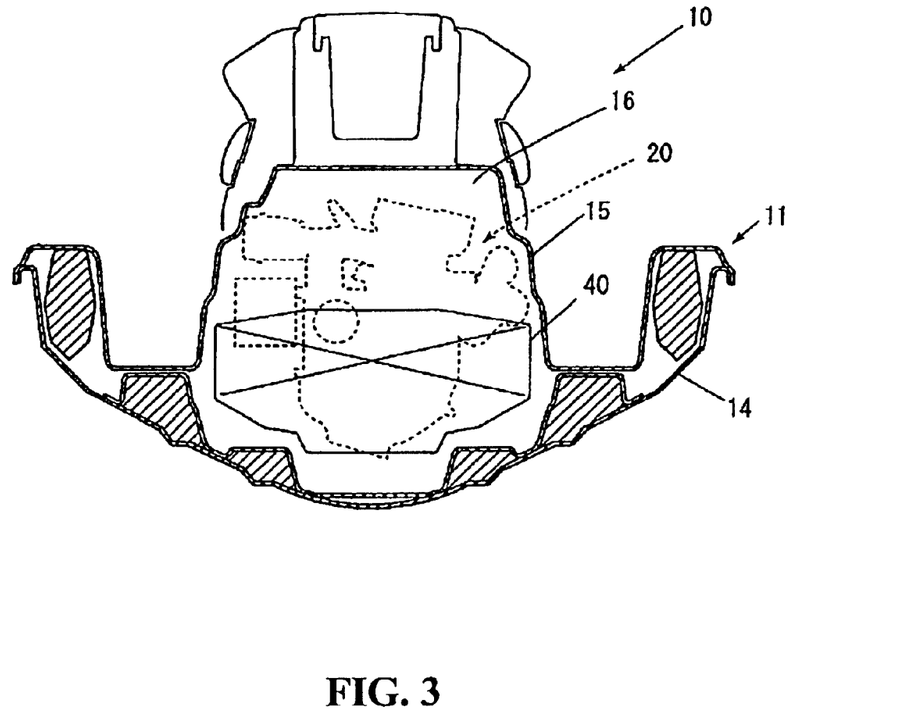
FIG. 3 is an enlarged cross-sectional view (a cross-sectional view, partly omitted) of part III—III of FIG. 1.

As shown in FIGS. 1 and 2, exhaust rotating the turbine in the turbine part 73 passes through a piping 74, a back flow prevention chamber 75 for preventing water back flow (water inclusion into the turbocharger 70) during capsizing, a water muffler 76 and piping 77, and is then exhausted into the water flow by the jet pump 30.

As shown in these drawings and described above, the heat exchanger 50 has the case 51 having the intake inlet 51i in communication with the supercharger (turbocharger) 70 of the engine 20 and the outlet 51o in communication with the intake port 21 of the engine 20 and the heat exchanger fins 61 housed in the case 51. The intake inlet 51i and the outlet 51o are formed on the same side (the upper side of the case 51 in this case).

Specifically, a cooling unit 60 as a body that is different from the case 51. The cooling unit 60 is housed in the case 51 to construct the heat exchanger 50.

Figure 6A:
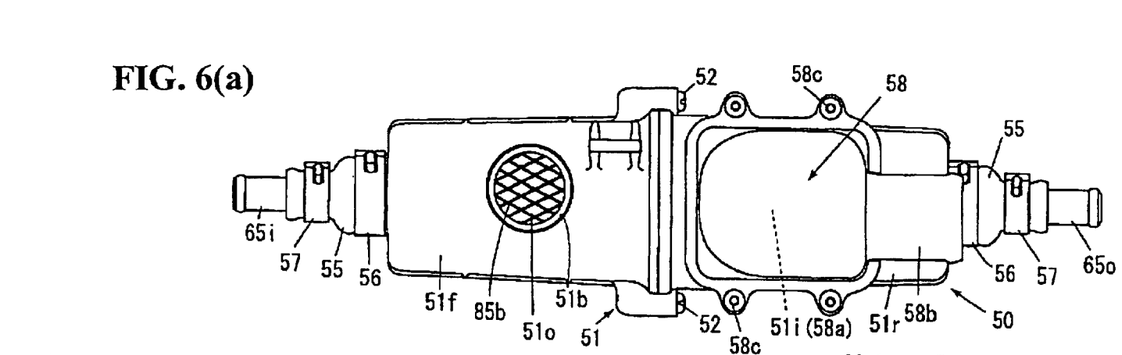
FIG. 6(a) is a plan view of a heat exchanger 50 and FIG. 6(b) is a front view, partially cut-away, thereof.

The cooling unit 60 has a plurality of the heat exchanger fins 61 stacked with a predetermined pitch in the front and rear directions (in the right and left directions in FIG. 6(a)). A plurality of water pipes 62 extend through the heat exchanger fins 61 in the front and rear directions and having outer periphery surfaces thereof that are welded to the heat exchanger fins 61. Front and rear support plates 63f, 63r support the front and rear of the water pipes 62. A front member 65f is arranged in the front portion of the front support plate 63f and together with the front support plate 63f, forming a cooling water W admitting chamber 64i and a cooling water inflow pipe 65i. A rear member 65r is arranged in the rear portion of the rear support plate 63r and together with the rear support plate 63r forms a cooling water W discharging chamber 64o and a cooling water discharging pipe 65o. An isolating plate 66f is arranged in the front portion of the heat exchanger fins 61 that is welded to the outer circumference surfaces of the water pipes 62 and completely isolates the water admitting chamber 64i from the heat exchanger fins 61. An isolating plate 66r is arranged in the rear portion of the heat exchanger fins 61 and is welded to the outer circumference surfaces of the water pipes 62 and completely isolates the water discharging chamber 64o from the heat exchanger fins 61. Side plates 67L, 67R (see FIG. 7(b)) are provided for covering the right and left (the front and back sides of the sheet in FIG. 6(b)) of the heat exchanger fins 61 between the isolating plates 66f, 66r. The front and rear edges of the side plates 67L, 67R are welded to the isolating plates 66f, 66r. The inner surfaces of the side plates 67L, 67R are welded to the side edges of the heat exchanger fins 61. The front support plate 63f and the front member 65f are welded to be integrated. The rear support plate 63r and the rear member 65r are also welded to be integrated.

The cooling water inflow pipe 65i is connected via the cooling water hose 91 (see FIG. 5) to the cooling water intake in the jet pump 30. The discharging pipe 65o is connected via the cooling water hose 92 (see FIG. 5) and the water jacket (not shown) of the turbocharger 70 to the discharging port (not shown) of the water muffler 77.

The cooling water W from the jet pump 30 flows from the inflow pipe 65i through the admitting chamber 64i into the plurality of water pipes 62. In this process, the water pipes 62 and the heat exchanger fins 61 are cooled. The cooling water W is discharged from the discharging chamber 64o through the discharging pipe 65o, the cooling water hose 92 and the water jacket of the turbocharger 70 to the water muffler 77.

The case 51 is a double-split case having a front case 51f and a rear case 51r. The front and rear cases 51f, 51r are interpose between the cooling unit 60. The front and rear cases 51f, 51r are coupled with bolts 52 to house the cooling unit 60 in the case 51. In the state where the cooling unit 60 is housed in the case 51, the outer peripheries of the isolating plates 66f, 66r are intimately connected with the inner surface of the case 51.

Figure 6B:
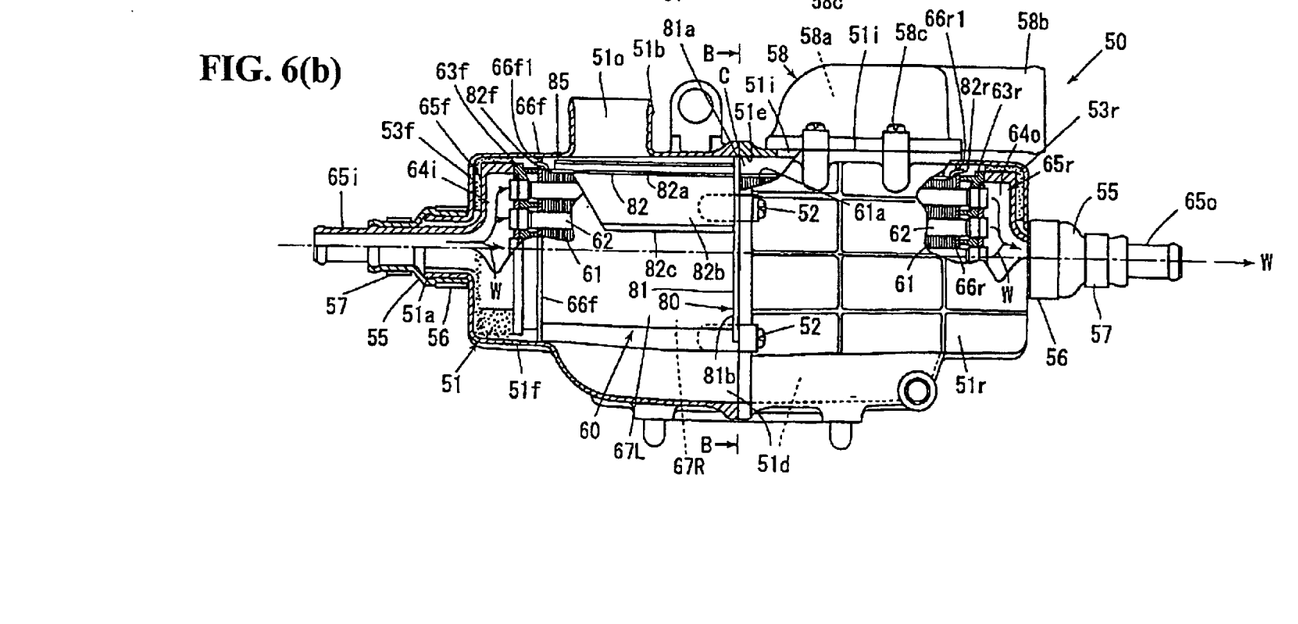
Figure 7A:
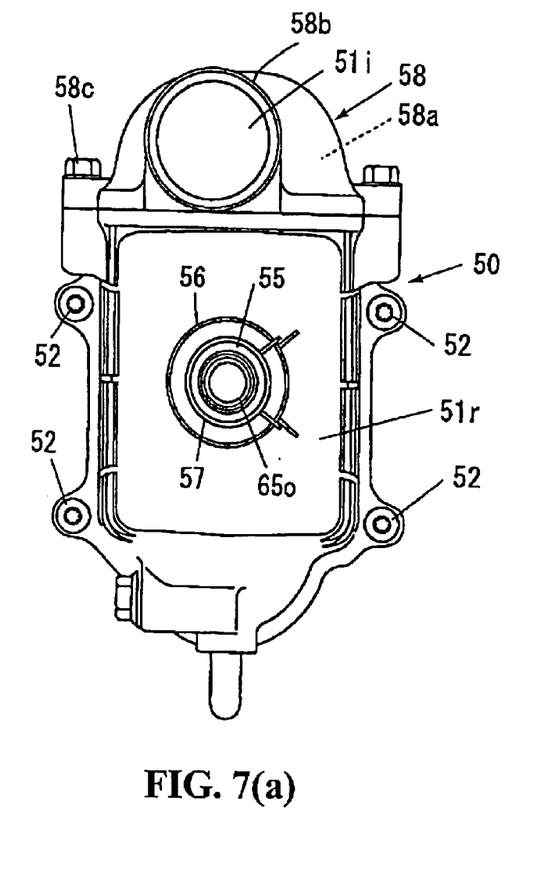
FIG. 7(a) is a right side view of the heat exchanger 50 and FIG. 7(b) is a cross-sectional view taken along line B—B of FIG. 6(b)
Figure 7B:
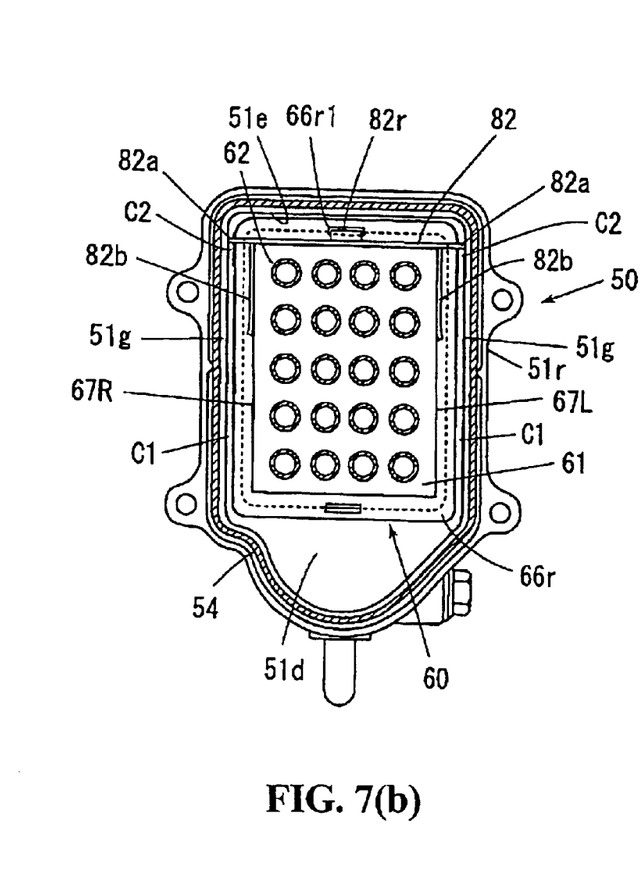

In FIG. 6(b), cushion materials 53f, 53r are interposed between the inner surface of the case 51 and the cooling unit 60. In FIG. 7(b), a gasket 54 is interposed between the split surfaces of the front and rear cases 51f, 51r.

The front case 51f is formed with a cylindrical part 51a into which the inflow pipe 65i of the cooling unit 60 is inserted. A tube 55 is provided to be across the cylindrical part 51a and the inflow pipe 65i. The tube 55 is fastened to the cylindrical part 51a and the inflow pipe 65i by clamps 56, 57 so as to prevent any foreign matters from being included into the case 51. The coupling construction of the rear case 51r and the discharging pipe 65o of the cooling unit 60 is similar.

The intake inlet 51i is formed in the upper surface of the rear case 51r. The intake inlet 51i is covered by an intake admission member 58. The intake admission member 58 has an intake admitting chamber 58a continuous to the intake inlet 51i above the intake inlet 51i and a pipe part 58b continuous to the intake admitting chamber 58a extended rearwardly. The pipe part 58b is connected via the piping 72 (see FIG. 5) to the compressor part 71 of the supercharger (turbocharger) 70. The intake admission member 58 is fixed to the upper surface of the rear case 51r via the gasket, not shown, with four bolts 58c.

A pipe part 51b forming the air outlet 51o is formed in the upper surface of the front case 51f. The pipe part 51 is connected via a tube 51c (see FIGS. 4 and 6) to an intake admission pipe part 23a (see FIG. 4) of the surge tank 23.

The lower portions of the rear case 51r and the front case 51f are formed with a communication passage 51d communicating both to each other in the state where both are coupled (in the state shown in FIG. 6).

In the heat exchanger 50 as described above, basically, air from the compressor part 71 of the turbocharger 70 is directed downwardly from the intake inlet 51i into the rear case 51r. In the process, the air is contacted with the heat exchanger fins 61 in the rear case 51r to be cooled. The air passes through the communication passage 51d to enter the front case 51f. In the process flowing above from below, the air is in contact with the heat exchanger fins 61 in the front case 51f to be further cooled, and is then supplied from the outlet 51o to surge tank 23.

In the heat exchanger having the above-described basic construction, in the case of taking no measures, other than an original air channel, that is, the above-described channel in which air enters the intake inlet 51i to be contacted with the heat exchanger fins 61 and then exits from the outlet 51o, there is formed a channel (C) through a space C between an outer periphery 61a (see FIG. 6(b)) of the heat exchanger fin 61 and an inner wall surface 51e of the case 51. Part of the air entering the intake inlet 51i is hardly in contact with the heat exchanger fins 61 and then passes through the space C to exit from the outlet 51o. The heat exchanger effectiveness is not enough.

The heat exchanger 50 of this working example is provided with a plate 80 as a body that is different from the case 51 which partially closes a space (at least the space C in this working example) between the outer periphery 61a of the heat exchanger fin 61 and the case inner wall surface 51e to form an air channel in a portion other than a closing part thereof (that is, an original air channel).

Figures 8A, 8B, 8C:
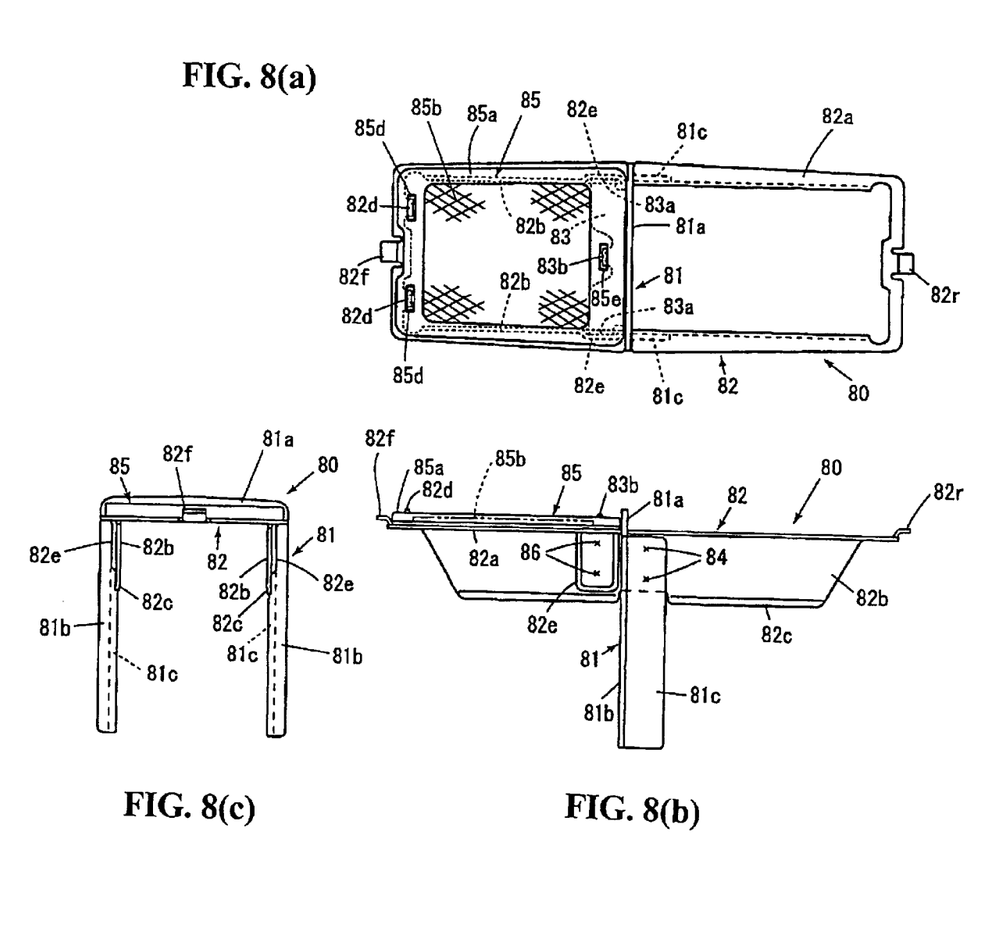
FIG. 8(a) is a plan view of a plate 80.
FIG. 8(b) is a front view thereof.
FIG. 8(c) is a left side view thereof.

FIG. 8(a) is a plan view showing the plate 80. FIG. 8(b) is a front view thereof. FIG. 8(c) is a left side view thereof.

The plate 80 is made of aluminum, and basically, is a plate of a substantially T shape in the front view whereby a first plate 81 and a second plate 82 are welded together.

The first plate 81 is a plate of a substantially inverted U shape in the side view, as shown in FIG. 8(c) and has a head part 81a extending to the right and left and a pair of leg parts 81b hung from both the ends. A portion of the leg part 81b is bent rearwardly to form a welding strip 81c with the second plate 82.

The first plate 81 can be constructed such that one plate is punched and the welding strips 81c are then bent.

The second plate 82 is a plate of a substantially rectangular shape in plan view, as shown in FIG. 8(b), and has a rectangular-shaped part 82a thereof and a pair of hanger parts 82b, 82b hung inside of the right and left sides (the upper and lower sides in the drawing) of the rectangular-shaped part 82a. A lower edge 82c of the hanger part 82b is bent slightly outwardly.

The front and rear (the right and left in FIGS. 8(a) and 8(b)) of the rectangular-shaped part 82a are formed with engaging strips 82f, 82r with the isolating plates 66 (see FIG. 6(b)) of the cooling unit 60.

The second plate 82 can be constructed such that one plate is punched and the hanger parts 82b, the lower edges 82c, the engaging strips 82f, 82r and later-described engaging strips 82d, 82d are bent.

As shown in FIGS. 8(a) and 8(b), the first plate 81 and the second plate 82 are integrated by welding 84 the inner side surfaces of the upper portions of the welding strips 81c of the first plate 81 and the outer side surfaces of the hanger parts 82b of the second plate 82.

The basic construction of the plate 80 is described above. In this working example, a net member 85 is arranged in the outlet 51o for preventing foreign matter passage that is integrally provided in the plate.

The net member 85 is made of metal (e.g., aluminum) and as shown in FIG. 8(a), has a frame part 85a of a substantially rectangular shape in the plan view and a net part 85b integrally formed with the frame part 85a in the inside of the frame part 85a. The frame part 85a is provided in its front side with two engaging holes 85d, 85d and in its rear side with one engaging hole 85e. The inside of the front portion of the rectangular-shaped part 82a of the second plate 82 is integrally formed with the two engaging strips 82d, 82d. Near the front side of the first plate 81 in the second plate 82, a support plate 83 is formed with the engaging strip 83b for fixing the net member 85. The support plate 83 is integrally provided in the second plate 82 such that hanger parts 83a, 83a at both ends are welded 86 with the inner side surfaces of swell parts 82e in which the hanger parts 82b of the second plate 82 are partially swelled.

The net member 85 is integrally attached to the plate 80 such that the engaging holes 85d, 85d and 85e are engaged with the engaging strips 82d, 82d of the second plate 82 and the engaging strip 83b of the support plate 83.

The plate 80 is attached to the cooling unit 60 before assembling the cooling unit 60 into the case 51, as described above. The plate 80 is attached to the cooling unit 60 such that the upper portion of the cooling unit 60 is fitted between the hanger parts 82b, 82b of the second plate 82 (see FIGS. 6(b) and 7(b)) and the engaging strips 82f, 82r of the second plate 82 are engaged with engaging holes 66f1, 66r1 (see FIG. 7(b)) formed in the isolating plates 66f, 66r (see FIG. 6(b)) of the cooling unit 60.

In the state wherein the cooling unit 60 with the plate 80 attached thereto is assembled into the case 51, as described above (the state shown in FIGS. 6(a), 6(b), 7(a) and 7(b)), the first plate 81 of the plate 80 cooperates with the cooling unit 60 to isolate the inside of the case 51 into the intake inlet 51i and the outlet 51o except for the communication passage 51d portion.

More specifically, the head part 81a of the first plate 81 is positioned in the space C to block (close) an undesired air channel by the space C. The leg parts 81b, 81b of the first plate 81 are positioned on the right and left sides of the cooling unit 60 to block (close) spaces C1, C1 formed between the side plates 67 (L, R) of the cooling unit 60 and inner side wall surfaces 51g (see FIG. 7(b)) of the case 51.

As shown in FIG. 7(b), the second plate 82 is positioned so as to be contacted with the upper edges of the side plates 67 (L, R) in the upper portion of the cooling unit 60 and closes spaces C2 formed between the same and the inner side wall surfaces 51g of the case 51 on the right and left of the cooling unit 60 in the plan view.

The above-described heat exchanger 50 provides the following operational effects.

The heat exchanger 50 interposed between the supercharger 70 of the internal combustion engine 20 and the intake port 21 of the internal combustion engine 20 is provided with the case 51 having the intake inlet 51i in communication with the supercharger 70 and the outlet 51o in communication with the intake port 21 of the internal combustion engine. The heat exchanger fins 61 housed in the case 51 includes the plate 80 as a body that is different from the case 51 which partially closes spaces (the spaces C, C1 and C2 in this case) between the outer periphery of the heat exchanger fin 61 and the case inner wall surfaces 51e, 51g to form an air channel in a portion other than a closing part thereof (the original air channel in this case). Air entering the intake inlet 51i is all contacted with the heat exchanger fins 61 to exit from the outlet 51o.

The heat exchanger 50 can provide an effect for enhancing the heat exchanger effectiveness and the intake cooling efficiency.

In addition, when intake spit-back (the so-called back fire) from the combustion chamber of the internal combustion engine 20 occurs, in the prior art heat exchanger, part of the back fire entering the outlet can be hardly contacted with the heat exchanger fins and passes through the space C to exit from the intake inlet to the supercharger 70 side. A dedicated spark arrester is thus necessary. In the heat exchanger 50, the back fire is prevented from directly moving from the outlet 50o of the heat exchanger through the space C to the intake inlet 51i and is contacted with the heat exchanger fins 61 for cooling to be quenched. The dedicated spark arrester need not be provided.

Further, the plate 80 is a body that is different from the case. The space between the outer periphery of the heat exchanger fin 61 and the case inner wall surface can be closed by a simple construction.

This point will be described in detail as follows.

The case 51 is split into two (the front case 51f and the rear case 51r in this case) to house the cooling unit 60. At least the inner wall surfaces (51e, 51g) of the cases 51f, 51r are tapered to easily house the cooling unit 60 and to make the die cutting during case molding preferable.

In the basic construction (the main part) of the cooling unit 60, the plurality of heat exchanger fins 61 are stacked and the water pipes 62 extend therethrough. The shapes of the plurality of heat exchanger fins 61 are preferably the same due to the manufacture. It is very difficult to taper the overall outer shape along the inner surface of the case 51. As a result, the outer shape is a rectangular parallelepiped.

About the cooling unit 60, a space between the same and the inner wall surface of the case 51 is formed. Air from the intake inlet 51i may leak through the undesirable space to the outlet 51o (the so-called shortcut state).

Due to the above-described reason, it is difficult to solve such a problem by changing the shape of the cooling unit 60 or the inner shape of the case 51. As a result, the heat exchanger effectiveness of the heat exchanger 50 is lowered.

In this working example, as described above, the plate 80 as a body that is different from the case 51 is assembled into the case 51 to close the space by a simple construction. The above problem can be thus solved.

The plate 80 is made of aluminum. Intake air and back fire contacting with the plate 80 can be efficiently heat drawn relative to the case 51.

The intake inlet 51$i$ and the outlet 51$o$ are formed on the same side (the upper side in this working example) of the case 51, and between the intake inlet 51$i$ and the outlet 51$o$, the plate 80 closes the spaces between the inner wall surfaces (51$e$, 51$g$) of the case 51 on the side forming the intake inlet 51$i$ and the outlet 51$o$ (the upper side in this working example) and the outer periphery of the heat exchanger fin 61. The plate 80 and the heat exchanger 50 itself can be smaller.

A plurality of the heat exchanger fins 61 are stacked with a predetermined pitch, and the plate 80 partially closes the space between the outer periphery 61$a$ of at least one of the heat exchanger fins and the case inner wall surface. The pitch (the stacking interval) of the heat exchanger fins 61 and the attaching position of the plate 80 (particularly, the first plate 81) effective for the cooling efficiency and the back fire quenching can be selected freely.

The outlet 51$o$ is provided with the net member 85 for foreign matter passage prevention. In the event that the supercharger 70 and the heat exchanger fins 61 deteriorate and part of the supercharger and the heat exchanger fins peels (or falls), foreign matter (the peeled or the fallen objects) are stopped by the net member 85 to be prevented from reaching the intake port 21 of the internal combustion engine 20.

In particular, as in this working example, when the heat exchanger 50 is used in the small boat 10, the supercharger 70 and the heat exchanger fins 61 easily deteriorate due to moisture and salt included in the intake air. Such a construction is particularly effective for using the heat exchanger 50 in a small boat.

The net member 85 is integrally provided in the plate 80. Attachment of the net member 85 and assembling of the plate 80 are done at the same time. The net member 85 need not be attached separately.

The small planing boat 10 provides the following operational effects.

The internal combustion engine 20 with the supercharger 70 is mounted in the body 11 having the hull 14 and the deck 15. The surge tank 23 and the inter-cooler 50 are in communication with the intake port 21 of the internal combustion engine 20 and are provided between the supercharger 70 and the internal combustion engine 20. The inter-cooler 50 is arranged immediately below the surge tank 23. A space S1 (see FIGS. 4 and 5) below the surge tank 23 can be used effectively. As a result, the small and valuable space in the body 11 can be used effectively.

The inter-cooler 50 is arranged immediately below the surge tank 23. The piping 51$c$ from the inter-cooler 50 to the surge tank 23 can be as short as possible. The intake temperature rise in the process of passing through the piping 51$c$ can be reduced. As a result, the intake cooling effect (intake concentration) can be improved to increase the output of the internal combustion engine 20.

The inter-cooler 50 has in its upper portion the intake inlet 51$i$ from the supercharger 70 and the outlet 51$o$ to the surge tank 23. The intake inlet 51$i$ is provided on the supercharger 70 side arranged on one side (the rear side in this working example) of the internal combustion engine 20. The outlet 51$o$ is provided on the other side. The supercharger 70, the inter-cooler 50 and the surge tank 23 can be connected by short ducts (the piping 72 and 51$c$).

A connecting space of the outlet 51$o$ of the inter-cooler 50 and the surge tank 23 immediately above the inter-cooler 50 (a space formed between the lower side of the surge tank 23 and the inter-cooler 50) S2 (see FIGS. 4 and 5) can be used to connect the intake inlet 50$i$ and the supercharger 70 of the inter-cooler 50. The small and valuable space in the body 11 can be used more effectively.

A small planing boat in which the water cooling inter-cooler 50 is arranged in the intake system of the internal combustion engine 20 has the cooling water passage 91 receiving the cooling water W supplied to the inter-cooler 50 from the outside of the planing boat 10 for supply. In the small planing boat 10 equipped with the internal combustion engine 20 with the supercharger 70, the inter-cooler 50 is cooled by low-temperature water (seawater or the like) received from the outside of the planing boat.

Other heat exchangers for cooling the inter-cooler 50 are unnecessary.

The cooling water passage 91 communicates the jet pump 30 making the small planing boat propulsive to the inter-cooler 50. Supply of cooling water to the inter-cooler 50 is done from the jet pump 30 through the cooling water passage 91.

Other pumps for supplying cooling water to the inter-cooler 50 are unnecessary.

The cooling water passage 91 directly communicates the jet pump 30 making the small planing boat propulsive to the inter-cooler 50. The inter-cooler 50 is directly cooled by cooling water from the jet pump 30 (not via other cooled bodies e.g., the internal combustion engine 20 and the turbocharger 70).

The intake concentration is enhanced to increase the output of the internal combustion engine 20.

The cooling water hose 91 is replaced with the cooling water hose 92 to supply cooling water from the intake inlet 51$i$ side into the inter-cooler 50. The high-temperature intake inlet 51$i$ side can be cooled efficiently in the inter-cooler 50.

The intake cooling effect of the entire inter-cooler 50 is improved to increase the output of the internal combustion engine 20.

The working examples of the present invention are described above. The present invention is not limited to the working examples. The present invention can be modified and embodied as needed within the scope of the purposes of the present invention.

For example, the shapes of the plate 80 and the net member 85 can be modified as needed corresponding to the inner shape of the heat exchanger 50 and the shape of the heat exchanger fins 61.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat exchanger for use in operation with a super-charger of an internal combustion engine and an intake port of the internal combustion engine comprising:

a case having an intake inlet and an outlet formed on a first side of said case, said intake inlet being in communication with said supercharger, and said outlet being in communication with the intake port of said internal combustion engine;

heat exchanger fins housed in the case between said intake inlet and said outlet;

a space inside the case between an outer periphery of said heat exchanger fins and a case inner wall surface, the space serving as an air channel; and a plate positioned inside said case adjacent to said first side of said case, the plate closing the space formed between the outer periphery of the heat exchanger fins and the case inner wall surface, wherein the plate and the case are formed of different materials.

2. The heat exchanger according to claim 1, wherein said plate is made of aluminum.

3. The heat exchanger according to claim 2, wherein a plurality of said heat exchanger fins are stacked with a predetermined pitch, and said plate partially closes the space between the outer periphery of at least one of the heat exchanger fins and the case inner wall surface.

4. The heat exchanger according to claim 2, wherein said outlet is provided with a net member for preventing passage of foreign matter.

5. The heat exchanger according to claim 1, wherein a plurality of said heat exchanger fins are stacked with a predetermined pitch, and said plate partially closes the space between the outer periphery of at least one of the heat exchanger fins and the case inner wall surface.

6. The heat exchanger according to claim 5, wherein said outlet is provided with a net member for preventing passage of foreign matter.

7. The heat exchanger according to claim 1, wherein said outlet is provided with a net member for preventing passage of foreign matter.

8. The heat exchanger according to claim 7, wherein said net member is integrally provided in said plate.

9. The heat exchanger according to claim 8, wherein said heat exchanger is disposed in a boat.

10. A heat exchanger for use in operation with a supercharger of an internal combustion engine and an intake port of the internal combustion engine, comprising:

case having an intake inlet and an outlet formed on an upper side case, said intake inlet being in communication with said supercharger, and said outlet being in communication with the intake port of said internal combustion engine;

heat exchanger fins operatively positioned within the case between said intake inlet and said outlet;

a space inside the case between an outer periphery of said heat exchanger fins and a case inner wall surface, the space serving as an air channel in a portion of said case;

a plate disposed inside said case adjacent to upper first of said case, the plate partially closing said space between the outer periphery of said heat exchanger fin and the case inner wall surface, wherein said plate and the case are constructed of different materials.

11. The heat exchanger according to claim 10, wherein said plate is made of aluminum.

12. The heat exchanger according to claim 11, wherein a plurality of said heat exchanger fins are stacked with a predetermined pitch, and said plate partially closes the space between the outer periphery of at least one of the heat exchanger fins and the case inner wall surface.

13. The heat exchanger according to claim 10, wherein a plurality of said heat exchanger fins are stacked with a predetermined pitch, and said plate partially closes the space between the outer periphery of at least one of the heat exchanger fins and the case inner wall surface.

14. The heat exchanger according to claim 10, wherein said outlet is provided with a net member for preventing passage of foreign matter.

15. The heat exchanger according to claim 10, wherein said plate includes a first plate secured at a predetermined angle relative to a second plate.

16. A boat including a heat exchanger disposed therein, the heat exchanger being for use in operation with a supercharger of an internal combustion engine of the boat and an intake port of the internal combustion engine, the heat exchanger comprising:

a case having an intake inlet and an outlet formed on a first side of said case, said intake inlet being in communication with said supercharger, and said outlet being in communication with the intake port of said internal combustion engine;

heat exchanger fins housed in the case between said intake inlet and said outlet;

a space inside the case between an outer periphery of said heat exchanger fins and a case inner wall surface, the space serving as an air channel; and a plate positioned inside said case adjacent to said first side of said case, the plate closing the space formed between the outer periphery of the heat exchanger fins and the case inner wall surface, wherein the plate and the case are formed of different materials, and wherein the outlet is provided with a net member for preventing passage of foreign matter.

* * * * *